(12) United States Patent
Park et al.

(10) Patent No.: US 11,385,397 B2
(45) Date of Patent: Jul. 12, 2022

(54) LIQUID CRYSTAL DISPLAY DEVICE

(71) Applicant: SAMSUNG ELECTRONICS CO., LTD., Suwon-si (KR)

(72) Inventors: Yoonki Park, Suwon-si (KR); Byoungjin Cho, Suwon-si (KR); Jongbin Kim, Suwon-si (KR); Wonyeop Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/257,514

(22) PCT Filed: Apr. 5, 2019

(86) PCT No.: PCT/KR2019/004092
§ 371 (c)(1),
(2) Date: Dec. 31, 2020

(87) PCT Pub. No.: WO2020/017737
PCT Pub. Date: Jan. 23, 2020

(65) Prior Publication Data
US 2021/0302646 A1    Sep. 30, 2021

(30) Foreign Application Priority Data
Jul. 16, 2018   (KR) .................. 10-2018-0082335

(51) Int. Cl.
*F21V 8/00*   (2006.01)
(52) U.S. Cl.
CPC ......... *G02B 6/0055* (2013.01); *G02B 6/0068* (2013.01)

(58) Field of Classification Search
CPC .... G02B 6/0055; G02B 6/0068; G02B 6/005; G02F 1/1333; G02F 1/1335; G02F 1/133605; G02F 1/133308; G02F 1/133524; G02F 1/133603; G02F 1/133607; G02F 1/133553
See application file for complete search history.

(56) References Cited

U.S. PATENT DOCUMENTS

| | | |
|---|---|---|
| 6,497,946 B1 | 12/2002 | Kretman et al. |
| 8,125,586 B2 | 2/2012 | Byoun et al. |
| 8,704,258 B2 | 4/2014 | Tasaki et al. |

FOREIGN PATENT DOCUMENTS

| | | |
|---|---|---|
| KR | 10-2009-0063488 A | 6/2009 |
| KR | 10-2009-0120556 A | 11/2009 |

(Continued)

OTHER PUBLICATIONS

KR 2013027206 A machine translation.*

(Continued)

*Primary Examiner* — Joseph L Williams
*Assistant Examiner* — Jose M Diaz
(74) *Attorney, Agent, or Firm* — Sughrue Mion, PLLC (57) ABSTRACT

Disclosed is a liquid crystal display device including a reflective sheet with high rigidity and low shrinkage and expansion, the liquid crystal display device comprising: a liquid crystal panel; a light guide plate provided below the liquid crystal panel; a light source for supplying light to the light guide plate; a reflective sheet provided below the light guide plate; a glass fiber coating layer provided on the upper surface and/or the lower surface of the reflective sheet; and a lower chassis provided below the reflective sheet.

14 Claims, 10 Drawing Sheets

(56) References Cited

FOREIGN PATENT DOCUMENTS

| | | |
|---|---|---|
| KR | 10-2011-0057888 A | 6/2011 |
| KR | 10-2012-0123242 A | 11/2012 |
| KR | 10-2012-0130717 A | 12/2012 |
| KR | 10-2013-0027206 A | 3/2013 |
| KR | 10-2013-0030442 A | 3/2013 |
| KR | 20150016993 A * | 2/2015 |
| KR | 10-2016-0043861 A | 4/2016 |
| KR | 10-1812834 B1 | 12/2017 |

OTHER PUBLICATIONS

KR 20150016993 A machine translation.*
International Search Report dated Jul. 11, 2019 issued by the International Searching Authority in International Application No. PCT/KR2019/004092 (PCT/ISA/210).
International Written Opinion dated Jul. 11, 2019 issued by the International Searching Authority in International Application No. PCT/KR2019/004092 (PCT/ISA/237).

* cited by examiner

LIQUID CRYSTAL DISPLAY DEVICE

TECHNICAL FIELD

The disclosure relates to a liquid crystal display device, and more particularly, to a liquid crystal display device including a reflective sheet.

BACKGROUND ART

Recently, a liquid crystal display device using light emitting diodes as a light source is gradually increasing in size.

A liquid crystal panel used in the liquid crystal display device cannot emit light by itself, and therefore, requires a separate light source.

Accordingly, the liquid crystal display device is provided with a backlight device including a light source on the rear of the liquid crystal panel. When the backlight device irradiates light toward the liquid crystal panel, the liquid crystal panel may display an image.

In general, the backlight device may be classified into an edge type backlight device and a direct type backlight device according to an arrangement structure of the light source.

The edge type backlight device has a structure in which a light source is disposed on one side of a light guide plate, or a pair of light sources are disposed on both sides of the light guide plate. A reflective sheet is provided under the light guide plate to reflect the light exiting the rear surface of the light guide plate toward the liquid crystal panel.

On the other hand, the direct type backlight device has a structure in which a plurality of light sources are disposed under the light guide plate. A reflective sheet is provided under the light guide plate, and reflects the light reflected and returned by an optical sheet such as a diffusion plate provided on the upper surface of the light guide plate back toward the liquid crystal panel.

However, because the reflective sheet is disposed adjacent to the light source that generates heat, there is a problem that the reflective sheet may shrink and expand due to heat. When the reflective sheet has a large shrinkage and expansion, a wrinkle phenomenon in which the reflective sheet is wrinkled may occur.

When the wrinkle phenomenon of the reflective sheet occurs, a luminance difference may occur between the region of the liquid crystal panel corresponding to the region of the reflective sheet where the wrinkle phenomenon has occurred and the region of the liquid crystal panel corresponding to the region of the reflective sheet where the wrinkle phenomenon does not occur. Due to this difference in luminance, a spot phenomenon may appear in an image displayed on the liquid crystal panel.

In addition, as liquid crystal display devices become larger and larger, beadings are formed in the lower chassis supporting the reflective sheet to increase the strength of the lower chassis. However, in this case, there may be a problem that a portion of the reflective sheet corresponding to the beading sags. When the portion of the reflective sheet sags into the beading, a spot phenomenon may appear in an image displayed on the liquid crystal panel similar to the wrinkle phenomenon of the reflective sheet.

In addition, as the liquid crystal display devices become larger and larger, the flatness of the lower chassis supporting the reflective sheet may not be uniform. When the flatness of the lower chassis is not good, a spot phenomenon may appear in an image displayed on the liquid crystal panel similar to the wrinkle phenomenon of the reflective sheet.

In order to solve such a phenomenon, increasing the thickness of the reflective sheet may be considered. However, this increases the overall thickness of the liquid crystal display device, so there is a problem in that the trend of slimming is reversed. Therefore, a reflective sheet having a thin thickness and high stiffness is required.

DISCLOSURE OF INVENTION

Technical Problem

The disclosure has been developed in order to overcome the above drawbacks and other problems associated with the conventional arrangement. An aspect of the disclosure relates a liquid crystal display device including a reflective sheet capable of improving stiffness without significantly increasing thickness while maintaining the existing optical characteristics and reducing shrinkage and expansion due to heat.

Technical Solution

According to an aspect of the disclosure, a liquid crystal display device may include a liquid crystal panel; a light guide plate disposed under the liquid crystal panel; a light source to supply light to the light guide plate; a reflective sheet provided under the light guide plate; a glass fiber coating layer provided on one of an upper surface and a lower surface of the reflective sheet; and a lower chassis disposed under the reflective sheet.

The liquid crystal display device may include a bead coating layer provided between the light guide plate and the reflective sheet.

The glass fiber coating layer may be provided on the lower surface of the reflective sheet, and the bead coating layer may be provided on the upper surface of the reflective sheet.

The glass fiber coating layer may be provided on the upper surface of the reflective sheet, and the bead coating layer may be provided on an upper surface of the glass fiber coating layer.

The light source may include a plurality of light emitting diodes disposed on one side of the light guide plate.

The light source may include a plurality of light emitting diodes disposed under the light guide plate.

The reflective sheet and the glass fiber coating layer may include a plurality of through holes through which the plurality of light emitting diodes pass.

The lower chassis may include at least one beading.

The glass fiber coating layer may be formed of glass fiber pieces and a resin.

The reflective sheet may be formed by mixing glass fiber pieces with any one of polyester terephthalate (PET), polycarbonate (PC), and polyester.

According to another aspect of the disclosure, a liquid crystal display device may include a liquid crystal panel; a light guide plate disposed under the liquid crystal panel; an optical sheet disposed on an upper surface of the light guide plate; a light source to supply light to the light guide plate; a reflective sheet provided under the light guide plate; a glass fiber coating layer provided on a lower surface of the reflective sheet; and a lower chassis disposed under the reflective sheet and having at least one beading.

Advantageous Effects

When a glass fiber coating layer is formed on one surface of the reflective sheet like the reflective sheet of the liquid crystal display device according to an embodiment of the disclosure, stiffness of the reflective sheet may be increased. When the stiffness of the reflective sheet is improved in this way, wrinkle phenomenon of the reflective sheet such as sagging or bending of the reflective sheet may be prevented or reduced. Accordingly, image spot phenomenon of the liquid crystal display device caused by the wrinkle phenomenon of the reflective sheet may be improved.

In addition, when the glass fiber coating layer is formed on one surface of the reflective sheet like the reflective sheet of the liquid crystal display device according to an embodiment of the disclosure, the total thickness of the reflective sheet and the glass fiber coating layer may be reduced compared to increasing the stiffness of the reflective sheet by increasing the thickness of the reflective sheet itself. Therefore, the thickness of the liquid crystal display device may be reduced.

In addition, when the glass fiber coating layer is formed on one surface of the reflective sheet like the reflective sheet of the liquid crystal display device according to an embodiment of the disclosure, a coefficient of thermal expansion may be reduced, so that an expansion space provided around the reflective sheet may be reduced. Accordingly, degree of freedom in designing a width of the bezel of the liquid crystal display device may be increased.

BEST MODE FOR CARRYING OUT THE INVENTION

Hereinafter, embodiments of a liquid crystal display device according to the disclosure will be described in detail with reference to the accompanying drawings.

The matters defined herein, such as a detailed construction and elements thereof, are provided to assist in a comprehensive understanding of this description. Thus, it is apparent that embodiments may be carried out without those defined matters. Also, well-known functions or constructions are omitted to provide a clear and concise description of embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Figure 1:
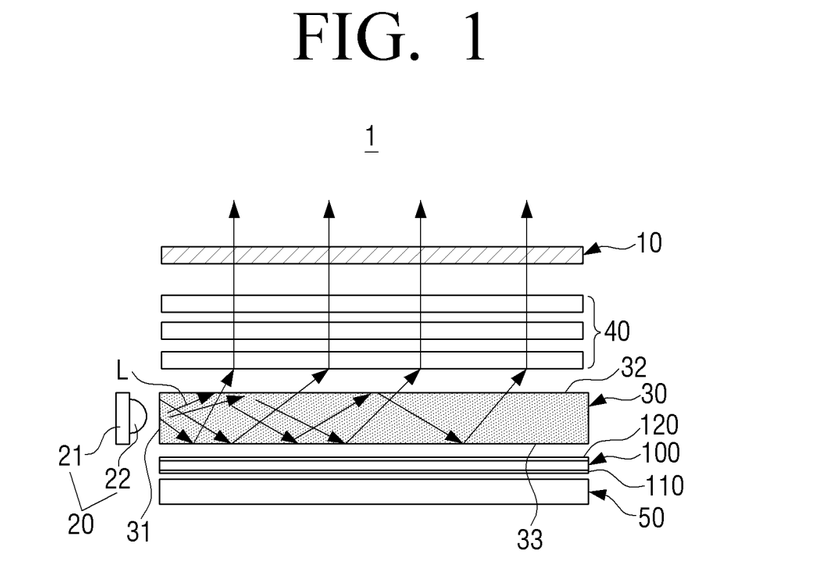
FIG. 1 is a view conceptually illustrating a liquid crystal display device according to an embodiment of the disclosure.

FIG. 1 is a view conceptually illustrating a liquid crystal display device according to an embodiment of the disclosure.

Referring to FIG. 1, a liquid crystal display device 1 according to an embodiment of the disclosure may include a liquid crystal panel 10, a light source 20, a light guide plate 30, a reflective sheet 100, and a lower chassis 50. In addition, although not illustrated, the liquid crystal display device 1 may include a housing capable of fixing the liquid crystal panel 10, the light guide plate 30, the light source 20, and the lower chassis 50. In addition, the light source 20, the light guide plate 30, the reflective sheet 100, and the lower chassis 50 may form a backlight device.

The liquid crystal panel 10 may be configured to display a color image using light L provided by the backlight device. The liquid crystal panel 10 may include a color filter substrate (not illustrated) having a color filter layer and a thin film transistor substrate (not illustrated) having thin film transistors, and a liquid crystal (not illustrated) may be accommodated between the color filter substrate and the thin film transistor substrate. Because the liquid crystal panel 10 may use a known technology, a detailed description thereof is omitted.

The light source 20 is to generate light supplied to the liquid crystal panel 10 and may be disposed in parallel with a side surface 31 of the light source 20 on one side of the light guide plate 30. The light source 20 may include a printed circuit board 21 and a plurality of light emitting diodes (LEDs) 22.

The printed circuit board 21 may be provided with a circuit for driving the plurality of light emitting diodes 22, and may be formed in a shape corresponding to the side surface 31 of the light guide plate 30. For example, the printed circuit board 21 may be formed in a strip shape having a narrow width and a long length.

The plurality of light emitting diodes 22 may disposed in a row on one surface of the printed circuit board 21 so as to face the side surface 31 of the light guide plate 30. Although one light emitting diode 22 is shown in FIG. 1, the plurality of light emitting diodes 22 are disposed in a direction perpendicular to the drawing. The number of light emitting diodes 22 may be appropriately determined according to the size of the liquid crystal panel 10.

The light guide plate 30 may be formed to minimize the loss of light L emitted from the light source 20 disposed at the side surface 31 of the light guide plate 30 to evenly distribute light over the entire surface of the liquid crystal panel 10, and at the same time to collect the light in one direction. The light guide plate 30 may be formed in a rectangular flat plate shape having a size corresponding to that of the liquid crystal panel 10 and may be formed of a transmissive material capable of transmitting light. For example, the light guide plate 30 may be formed of a transparent plastic such as polymethyl methacrylate (PMMA), polycarbonate (PC), or the like.

One side surface 31 of the light guide plate 30 may be an incident surface on which light emitted from the light source 20 is incident, and the upper surface 32 of the light guide plate 30 may be a light exit surface through which the light incident from the light source 20 is emitted toward the liquid crystal panel 10. Accordingly, the light emitted from the light source 20 is incident through the side surface 31 of the light guide plate 30 and is emitted to the liquid crystal panel 10 through the upper surface 32 of the light guide plate 30.

An optical sheet 40 may be disposed on the upper surface 32 of the light guide plate 30, that is, between the light guide plate 30 and the liquid crystal panel 10. The optical sheet 40 may minimize wasted light by using refraction and reflection of light, thereby improving brightness of light emitted through the light guide plate 30 and allowing the light to be evenly distributed. The optical sheet 40 may include a diffusion sheet that evenly diffuses light, a prism sheet that refracts light to improve brightness, a dual brightness enhancement film (DBEF) that selectively transmits and reflects light to improve brightness, etc. Because the optical sheet 40 is the same as the optical sheets used in the backlight device according to the prior art, a detailed description thereof is omitted.

The reflective sheet 100 may reflect the light exiting the lower surface 33 of the light guide plate 30 back toward the light guide plate 30. The light reflected by the reflective sheet 100 may travel to the liquid crystal panel 10 through the light guide plate 30.

Hereinafter, the reflective sheet 100 used in the liquid crystal display device 1 according to an embodiment of the disclosure will be described in detail with reference to FIGS. 2 and 3.

Figure 2:
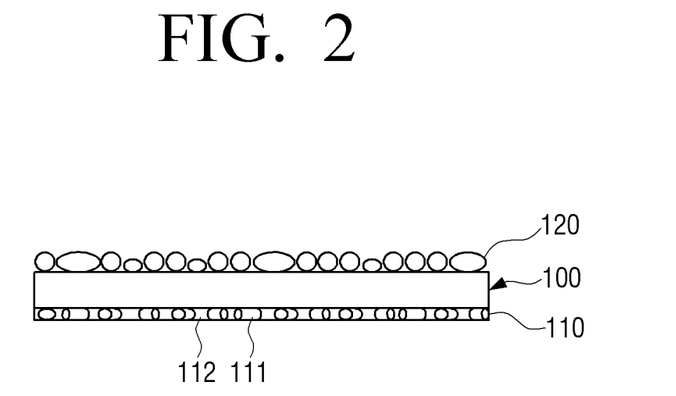
FIG. 2 is a cross-sectional view illustrating an example of a reflective sheet used in the liquid crystal display device of FIG. 1.
Figure 3:
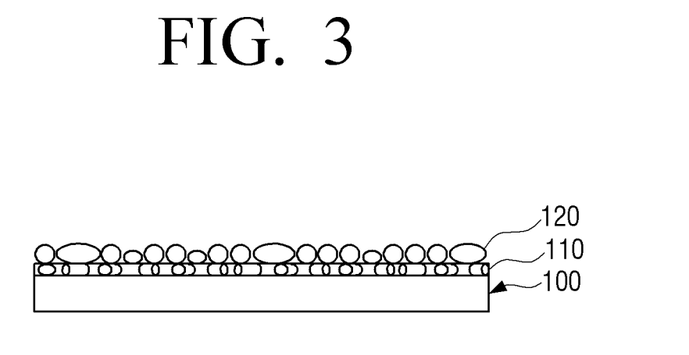
FIG. 3 is a cross-sectional view illustrating another example of a reflective sheet used in the liquid crystal display device of FIG. 1.

FIG. 2 is a cross-sectional view illustrating an example of a reflective sheet used in the liquid crystal display device of FIG. 1, and FIG. 3 is a cross-sectional view illustrating another example of a reflective sheet used in the liquid crystal display device of FIG. 1.

Referring to FIG. 2, a glass fiber coating layer 110 may be provided on the lower surface of the reflective sheet 100, and a bead coating layer 120 may be provided on the upper surface of the reflective sheet 100.

The reflective sheet 100 may be formed in a rectangular thin film shape corresponding to the light guide plate 30. The reflective sheet 100 may be formed of a white opaque plastic to reflect light emitted from the light guide plate 30. For example, the reflective sheet 100 may be formed of any one of polyester terephthalate (PET), polycarbonate (PC), and polyester.

The bead coating layer 120 may be provided on the upper surface of the reflective sheet 100 to prevent the light guide plate 30 and the reflective sheet 100 from coming into close contact with each other. Accordingly, the reflective sheet 100 may be spaced apart from the lower surface 33 of the light guide plate 30 by the thickness of the bead coating layer 120. The bead coating layer 120 may be formed to transmit or reflect light emitted from the lower surface 33 of the light guide plate 30. When the bead coating layer 120 is formed to transmit light, the light transmitted through the bead coating layer 120 is reflected from the upper surface of the reflective sheet 100 and enters the lower surface 33 of the light guide plate 30.

The glass fiber coating layer 110 may be provided on one surface of the reflective sheet 100 in order to increase stiffness of the reflective sheet 100. The reflective sheet 100 provided with the glass fiber coating layer 110 on one surface thereof as described above may be referred to as a glass fiber reinforced reflective sheet.

Referring to FIG. 2, the glass fiber coating layer 110 is provided on the lower surface of the reflective sheet 100. In other words, in the reflective sheet 100 illustrated in FIG. 2, the bead coating layer 120 is provided on the upper surface of the reflective sheet 100, and the glass fiber coating layer 110 is provided on the lower surface of the reflective sheet 100, thereby form a layered structure.

The glass fiber coating layer 110 may be formed by mixing glass fiber pieces 111 cut into a predetermined length with a resin 112 and applying it to the lower surface of the reflective sheet 100. When the glass fiber coating layer 110 is formed on the lower surface of the reflective sheet 100 as described above, the stiffness of the reflective sheet 100 may be improved.

The glass fiber coating layer 110 may be formed by mixing the glass fiber pieces 111 and the resin 112. As the glass fiber, E-glass fiber having excellent mechanical strength, electrical properties, and chemical properties may be used. The glass fiber pieces 111 cut from the glass fiber may have a diameter of 5 μm to 35 μm and a length of about 5 cm. The resin 112 may function as a binder fixing the glass fiber pieces 111 to the reflective sheet 100. As an example, polymethyl methacrylate (PMMA) may be used as the resin 112.

The thickness t1 of the glass fiber coating layer 110 may be about 10 μm to 200 μm depending on the size of the liquid crystal display device 1. For example, in the case of a 65" (inches) liquid crystal display device 1, when the glass fiber coating layer 110 having a thickness t1 of 0.01 mm is formed on the reflective sheet 100 having a thickness t0 of 0.26 mm, the total thickness t of the reflective sheet 100 and the glass fiber coating layer 110 (hereinafter, a total thickness of the reflective sheet) is 0.26+0.01=0.27 mm. In this case, the thickness t1 of the glass fiber coating layer 110 corresponds to about 4% of the total thickness t of the reflective sheet 100. In addition, when the glass fiber coating layer 110 having a thickness t1 of 0.2 mm is formed on the reflective sheet 100 having a thickness t0 of 0.26 mm, the total thickness t of the reflective sheet is 0.26+0.2=0.46 mm. In this case, the thickness t1 of the glass fiber coating layer 110 corresponds to about 43% of the total thickness t of the reflective sheet.

In general, in the case of the 65" liquid crystal display device 1, when the thickness t0 of the reflective sheet 100 is 0.26 mm, and the thickness t1 of the glass fiber coating layer 110 is 0.03 mm to 0.05 mm, the wrinkle phenomenon of the reflective sheet 100 may be prevented. In other words, when the thickness t1 of the glass fiber coating layer 110 is formed on the reflective sheet 100 at a ratio of about 10% to 16% of that of the reflective sheet 100, properties capable of preventing the wrinkle phenomenon may be obtained.

When the glass fiber coating layer 110 is formed on one surface of the reflective sheet 100 like the reflective sheet 100 according to an embodiment of the disclosure as described above, the thickness t of the reflective sheet 100 capable of preventing the wrinkle phenomenon may be reduced.

For example, in the case of an 88" liquid crystal display device 1, when the reflective sheet 100 with a thickness t0 of 0.31 mm is used, the wrinkle phenomenon may occur. However, when the thickness t0 of the reflective sheet 100 is 0.43 mm, the wrinkle phenomenon may be prevented. In other words, when the thickness t0 of the reflective sheet 100 is increased by 0.12 mm, the wrinkle phenomenon may be prevented.

However, when the glass fiber coating layer 110 is formed on one surface of the reflective sheet 100 like the reflective sheet 100 according to an embodiment of the disclosure, the total thickness t of the reflective sheet 100 and the glass fiber coating layer 110 may be reduced. In other words, when the glass fiber coating layer 110 having the thickness t1 of 0.05 mm is formed on the reflective sheet 100 having the thickness t0 of 0.31 mm, the wrinkle phenomenon of the reflective sheet 100 may be prevented.

FIG. 3 shows a structure in which the glass fiber coating layer 110 is provided on the upper surface of the reflective sheet 100, contrary to FIG. 2. In other words, the reflective sheet 100 shown in FIG. 3 has a layered structure in which the glass fiber coating layer 110 is formed on the upper surface of the reflective sheet 100 and the bead coating layer 120 is provided on the upper surface of the glass fiber coating layer 110.

The glass fiber coating layer 110 may be formed by mixing glass fiber pieces 111 cut into a predetermined length with a resin 112 and applying it to the upper surface of the reflective sheet 100. The structure of the glass fiber coating layer 110 is the same as that of the above-described glass fiber coating layer 110; therefore, a detailed description thereof is omitted.

In this case, the glass fiber coating layer 110 may be formed to transmit or reflect light emitted from the lower surface of the light guide plate 30. When the glass fiber coating layer 110 is formed to transmit light, the light transmitted through the glass fiber coating layer 110 is reflected from the upper surface of the reflective sheet 100 and enters the light guide plate 30. When the glass fiber coating layer 110 is formed on the upper surface of the reflective sheet 100 as described above, the stiffness of the reflective sheet 100 may be improved.

The bead coating layer 120 may be provided on the upper surface of the glass fiber coating layer 110 to prevent the light guide plate 30 and the glass fiber coating layer 110 from coming into close contact with each other. Accordingly, the glass fiber coating layer 110 may be spaced apart from the lower surface 33 of the light guide plate 30 by the thickness of the bead coating layer 120. The bead coating layer 120 may be formed to transmit or reflect light exiting the lower surface 33 of the light guide plate 30. When the bead coating layer 120 is formed to transmit light, the light that has passed through the bead coating layer 120 may be reflected by the glass fiber coating layer 110 or/and the upper surface of the reflective sheet 100 to enter the light guide plate 30.

As described above, when the glass fiber coating layer 110 is formed on one surface of the reflective sheet 100, that is, the upper surface of the reflective sheet 100 or the lower surface of the reflective sheet 100, the stiffness of the reflective sheet 100 may increase and the coefficient of thermal expansion of the reflective sheet 100 may decrease.

Table 1 below is a result of comparing the coefficient of thermal expansion of the reflective sheet according to the prior art and the coefficient of thermal expansion of the reflective sheet 100 having the glass fiber coating layer 110 according to an embodiment of the disclosure.

TABLE 1

| Reflective sheet material | Coefficient of thermal expansion | |
|---|---|---|
| | $10^{-6}$ m/mk | ratio |
| Polyester terephthalate(PET) | 59.5 | 48% |
| Polyester | 123.5 | 100% |
| Polyester-glass fiber-reinforced | 21.5 | 17% |

In Table 1 above, the coefficient of thermal expansion of polyester, which is a reflective sheet according to the prior art, is $123.5 \times 10^{-6}$ m/mk, and the coefficient of thermal expansion of the polyester terephthalate, which is a reflective sheet according to another prior art, is $59.5 \times 10^{-6}$ m/mk. The reflective sheet 100 provided with the glass fiber coating layer 110 (Polyester-glass fiber-reinforced) according to an embodiment of the disclosure has the coefficient of thermal expansion of $21.5 \times 10^{-6}$ m/mk. In this case, the reflective sheet 100 is formed of polyester. At this time, when the coefficient of thermal expansion of the reflective sheet made of polyester is 1, that is, 100%, the coefficient of thermal expansion of reflective sheet made of polyester terephthalate is 48%, which is less than that of the reflective sheet made of polyester. In other words, when the reflective sheet is made of polyester terephthalate, it can be seen that the coefficient of thermal expansion is reduced by 52% compared to the reflective sheet made of polyester.

As in the embodiment of the disclosure, the coefficient of thermal expansion of the reflective sheet 100 having the glass fiber coating layer 110 is 17% compared to that of the reflective sheet made of polyester, which has a small coefficient of thermal expansion. In other words, when using the reflective sheet 100 according to an embodiment of the disclosure, the coefficient of thermal expansion is reduced by 83% compared to the reflective sheet made of polyester, and is approximately ⅓ of the coefficient of thermal expansion of the reflective sheet made of polyester terephthalate.

In the case that the coefficient of thermal expansion of the reflective sheet 100 is reduced as described above, when designing the liquid crystal display device 1, an expansion space to be provided at the edge of the reflective sheet 100 may be reduced. When the expansion space is reduced, a non-screen area in which an image is not displayed in the liquid crystal display device 1 may be reduced. Accordingly, because the area of the screen in which the image is displayed may be increased and the non-screen area in which the image is not displayed may be reduced, there is an advantage in that the degree of freedom in designing the appearance of the liquid crystal display device 1 may be increased.

In the case that the reflective sheet 100 reinforced with the glass fiber coating layer 110 is used as described above, when the beading is formed on the lower chassis 50, the reflective sheet 100 may be prevented from sagging downward in the beading of the lower chassis 50, or an amount of sagging of the reflective sheet 100 may be reduced.

Figure 4:
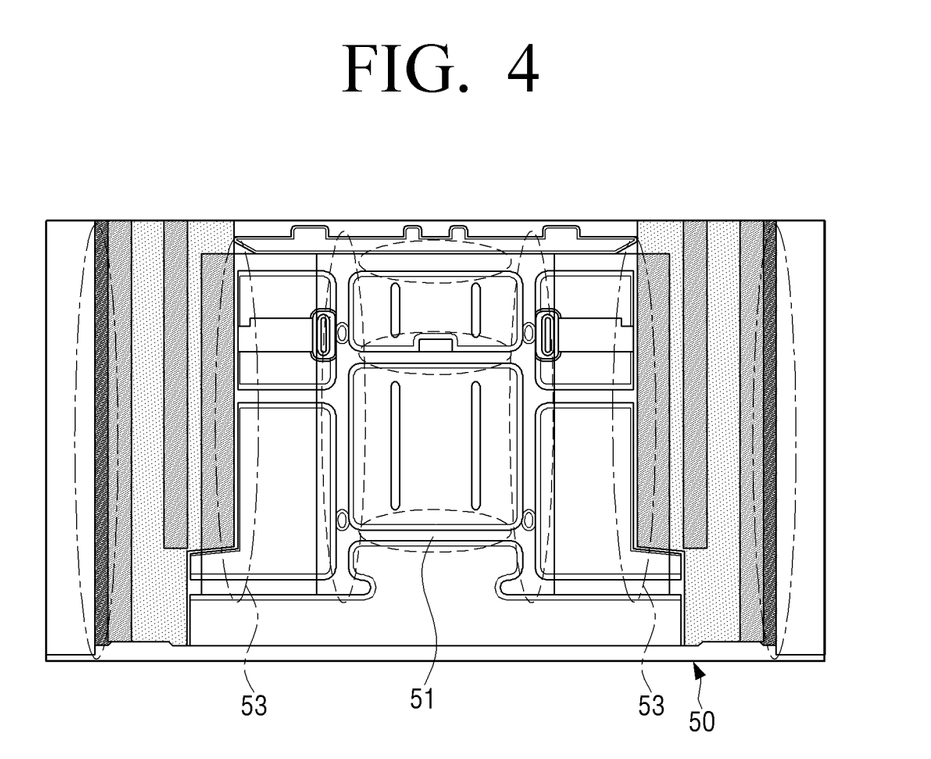
FIG. 4 is a partial plan view illustrating a portion of a lower chassis used in the liquid crystal display device of FIG. 1.

FIG. 4 is a partial plan view illustrating a portion of a lower chassis used in the liquid crystal display device of FIG. 1.

Referring to FIG. 4, it may be seen that a plurality of beadings 51 are formed in the lower chassis 50 used in the liquid crystal display device 1. In FIG. 4, portions in which the beadings 51 are formed on the lower chassis 50 are surrounded by dotted ellipses 52, respectively.

The reflective sheet 100 according to an embodiment of the disclosure may be disposed on the upper surface of the lower chassis 50 on which the plurality of beadings 51 are formed as described above. A case where the reflective sheet 100 including the glass fiber coating layer 110 is disposed on the beadings 51 of the lower chassis 50 is illustrated in FIG. 5.

Figure 5:
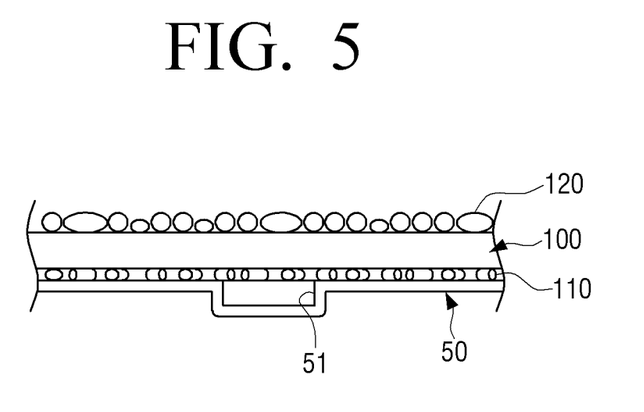
FIG. 5 is a partial cross-sectional view illustrating a state in which a reflective sheet according to an embodiment of the disclosure is disposed on a beading of a lower chassis.

FIG. 5 is a partial cross-sectional view illustrating a state in which a reflective sheet according to an embodiment of the disclosure is disposed on a beading of a lower chassis.

When the reflective sheet 100 having the glass fiber coating layer 110 provided on the lower surface of the reflective sheet 100 is disposed on the upper surface of the lower chassis 50, as illustrated in FIG. 5, the reflective sheet 100 covers the beading 51. At this time, because the reflective sheet 100 having the glass fiber coating layer 110 has high stiffness, the phenomenon that the reflective sheet 100 is sagging into the inside of the beading 51 may hardly occur. When sagging occurs, the amount of sagging may be reduced compared to that of the reflective sheet according to the prior art having a small stiffness. Like the reflective sheet according to the prior art, when the reflective sheet sags into the inside of the beadings 51, the reflective sheet is bent in a wave shape, and thus, a spot phenomenon may be seen when an image is displayed on the screen.

In general, when the reflective sheet expands, the reflective sheet sags into the inside of the beading in many cases. However, in the case of the reflective sheet 100 having the glass fiber coating layer 110 according to an embodiment of the disclosure, the coefficient of thermal expansion may be significantly reduced than that of the reflective sheet according to the prior art as described above. Accordingly, the reflective sheet 100 according to an embodiment of the disclosure has an advantage in that there is no sagging into the beading 51 or the amount of sagging is smaller than that of the reflective sheet according to the prior art.

In addition, the lower chassis 50 may include portions with poor flatness as illustrated in FIG. 4. In FIG. 4, portions of the lower chassis 50 having poor flatness are surrounded by ellipses 53 formed by a dashed-dotted line, respectively.

In FIG. 4, the portions 53 having poor flatness are portions in which a double material is used and have poor flatness compared to the other portions of the lower chassis 50. In the case that the flatness of the lower chassis 50 is not good, when the reflective sheet according to the prior art is disposed on the upper surface of the lower chassis 50, the reflective sheet is bent according to the flatness of the lower chassis 50. When the reflective sheet is bent in this way, a spot portion may be seen on the screen when an image is output, such as the wrinkle phenomenon of the reflective sheet.

However, when the reflective sheet 100 includes the glass fiber coating layer 110 as in the embodiment of the disclosure, the stiffness of the reflective sheet 100 is improved, so that the reflective sheet 100 may maintain a flat state without being bent along the flatness of the lower chassis 50 even in the case that there are portions with poor flatness in the lower chassis 50. Accordingly, when an image is output, a phenomenon in which a spotted portion is visible on the screen may be eliminated.

In the above description, the glass fiber coating layer 110 is formed on the upper surface or the lower surface of the reflective sheet 100. However, in order to increase the stiffness of the reflective sheet 100, when manufacturing the reflective sheet 100, a reflective sheet may be manufactured by mixing glass fiber pieces. For example, the reflective sheet may be formed by mixing glass fiber pieces with one of polyester terephthalate (PET), polycarbonate (PC), and polyester.

As another example, a glass fiber coating layer 110 may be additionally formed on one surface of the reflective sheet manufactured by mixing glass fiber pieces. In this way, when glass fiber pieces are mixed with the reflective sheet itself and the glass fiber coating layer 110 is additionally formed on the upper surface or the lower surface of the reflective sheet, the stiffness of the reflective sheet may be further increased.

In the above, the liquid crystal display device using an edge type backlight device in which the light source is disposed on one side of the light guide plate has been illustrated and described. However, the disclosure is not limited thereto. The disclosure may also be applied to a liquid crystal display device using a direct type backlight device in which a light source is disposed under a light guide plate.

Hereinafter, a liquid crystal display device using a direct type backlight device will be described with reference to FIGS. 6 to 8.

Figure 6:
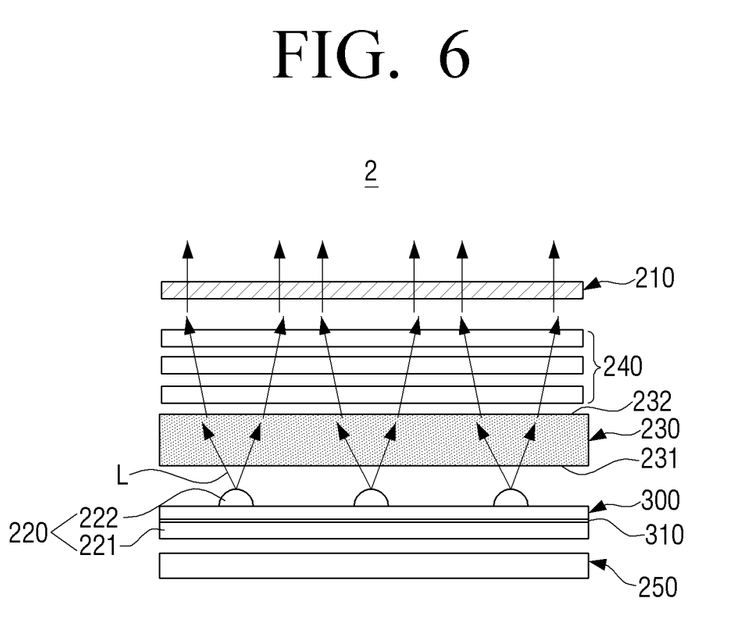
FIG. 6 is a view conceptually illustrating a liquid crystal display device according to another embodiment of the disclosure.

FIG. 6 is a view conceptually illustrating a liquid crystal display device according to another embodiment of the disclosure. FIG. 7 is a cross-sectional view illustrating an example of a reflective sheet used in the liquid crystal display device of FIG. 6. FIG. 8 is a cross-sectional view illustrating another example of a reflective sheet used in the liquid crystal display device of FIG. 6.

Referring to FIG. 6, a liquid crystal display device 2 according to an embodiment of the disclosure may include a liquid crystal panel 210, a light guide plate 230, a light source 220, a reflective sheet 300, and a lower chassis 250. Here, the light guide plate 230, the light source 220, the reflective sheet 300, and the lower chassis 250 may form a direct type backlight device.

The liquid crystal panel 210 may be configured to display a color image using light L provided by the backlight device. The liquid crystal panel 210 may include a color filter substrate (not illustrated) having a color filter layer and a thin film transistor substrate (not illustrated) having thin film transistors, and a liquid crystal (not illustrated) may be accommodated between the color filter substrate and the thin film transistor substrate. Because the liquid crystal panel 210 may use a known technology, a detailed description thereof is omitted.

The light guide plate 230 may be formed to minimize the loss of light L emitted from the light source 220 disposed under the light guide plate 30 to evenly distribute light over the entire surface of the liquid crystal panel 210, and at the same time to collect the light in one direction. The light guide plate 230 may be formed in a rectangular flat plate shape having a size corresponding to that of the liquid crystal panel 210 and may be formed of a transmissive material capable of transmitting light. For example, the light guide plate 230 may be formed of a transparent plastic such as polymethyl methacrylate (PMMA), polycarbonate (PC), or the like.

The lower surface 231 of the light guide plate 230 may be an incident surface on which light emitted from the light source 220 is incident, and the upper surface 232 of the light guide plate 230 may be a light exit surface through which the light incident from the light source 220 is emitted toward the liquid crystal panel 210. Accordingly, the light emitted from the light source 220 is incident through the lower surface 231 of the light guide plate 230, and is emitted to the liquid crystal panel 210 through the upper surface 232 of the light guide plate 230.

An optical sheet 240 may be disposed on the upper surface 232 of the light guide plate 230, that is, between the light guide plate 230 and the liquid crystal panel 210. The optical sheet 240 may minimize wasted light by using refraction and reflection of light, thereby improving brightness of light emitted through the light guide plate 230 and allowing the light to be evenly distributed. The optical sheet 240 may include a diffusion sheet that evenly diffuses light, a prism sheet that refracts light to improve brightness, a dual brightness enhancement film (DBEF) that selectively transmits and reflects light to improve brightness, etc. Because the optical sheet 240 is the same as the optical sheets used in the liquid crystal display device according to the prior art, a detailed description thereof is omitted.

The light source 220 is to generate light supplied to the liquid crystal panel 210, and may be disposed on the lower chassis 250 under the light guide plate 230. The light source 220 may include a printed circuit board 221 and a plurality of light emitting diodes 222. The printed circuit board 221 may be disposed on the lower chassis 250, and the plurality of light emitting diodes 222 may be disposed on the upper surface of the printed circuit board 210 at predetermined intervals.

In order to maintain a gap between the light guide plate 230 and the lower chassis 250, a plurality of supporters 260 for supporting the light guide plate 230 may be disposed on the upper surface of the lower chassis 250. The plurality of supporters 260 may be formed of a transparent material so as not to block light reflected by the reflective sheet 300 disposed on the lower chassis 250.

The reflective sheet 300 may reflect the light exiting the lower surface of the light guide plate 230 back toward the light guide plate 230. The light reflected by the reflective sheet 300 may travel to the liquid crystal panel 210 through the light guide plate 230.

Hereinafter, the reflective sheet used in the liquid crystal display device according to an embodiment of the disclosure will be described in detail with reference to FIGS. 7 and 8.

Figure 7:
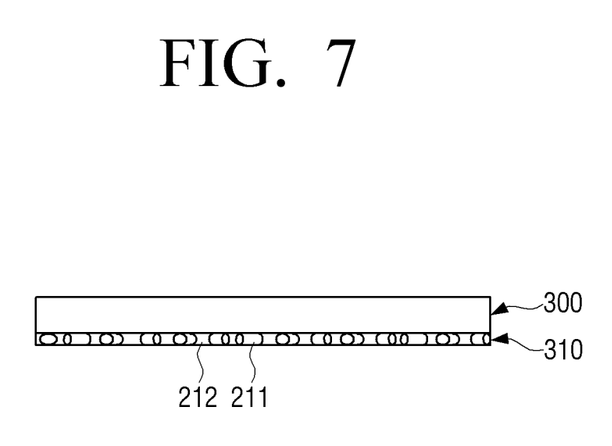
FIG. 7 is a cross-sectional view illustrating an example of a reflective sheet used in the liquid crystal display device of FIG. 6.

FIG. 7 is a cross-sectional view illustrating an example of a reflective sheet used in the liquid crystal display device of FIG. 6. FIG. 8 is a cross-sectional view illustrating another example of a reflective sheet used in the liquid crystal display device of FIG. 6.

The reflective sheet 300 may be formed in a rectangular thin film shape corresponding to the light guide plate 230. The reflective sheet 300 may be formed of a white opaque plastic to reflect light emitted from the lower surface 231 of the light guide plate 230. For example, the reflective sheet 300 may be formed of any one of polyester terephthalate (PET), polycarbonate (PC), and polyester.

A glass fiber coating layer 310 may be provided on one surface of the reflective sheet 300 in order to increase the stiffness of the reflective sheet 300.

Referring to FIG. 7, the glass fiber coating layer 310 is provided on the lower surface of the reflective sheet 300. In other words, the reflective sheet 300 shown in FIG. 7 may form a layered structure with the glass fiber coating layer 310 provided on the lower surface of the reflective sheet 300.

The glass fiber coating layer 310 may be formed by mixing glass fiber pieces 311 cut into a predetermined length with a resin 312 and applying it to the lower surface of the reflective sheet 300. When the glass fiber coating layer 310 is formed on the lower surface of the reflective sheet 300 as described above, the stiffness of the reflective sheet 300 may be improved. The structure of the glass fiber coating layer 310 is the same as the glass fiber coating layer 110 of the above-described embodiment; therefore, a detailed description thereof is omitted.

Figure 8:
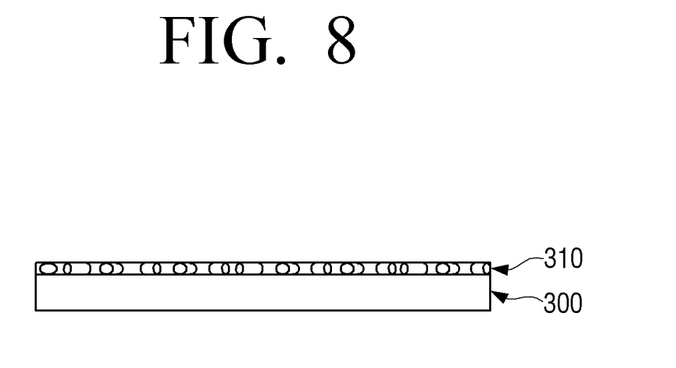
FIG. 8 is a cross-sectional view illustrating another example of a reflective sheet used in the liquid crystal display device of FIG. 6.

FIG. 8 shows a structure in which the glass fiber coating layer 310 is provided on the upper surface of the reflective sheet 300, contrary to FIG. 7. In other words, the reflective sheet 300 shown in FIG. 8 forms a layered structure with the glass fiber coating layer 310 provided on the upper surface of the reflective sheet 300.

The glass fiber coating layer 310 may be formed by mixing glass fiber pieces 311 cut into a predetermined length with a resin 312 and applying it to the upper surface of the reflective sheet 300. In this case, the glass fiber coating layer 310 may be formed to transmit or reflect light exiting from the lower surface 231 of the light guide plate 230. When the glass fiber coating layer 310 is formed to transmit light, the light transmitted through the glass fiber coating layer 310 is reflected by the upper surface of the reflective sheet 300 and enters the light guide plate 230. When the glass fiber coating layer 310 is formed on the upper surface of the reflective sheet 300 as described above, the stiffness of the reflective sheet 300 may be improved.

The reflective sheet 300 having the glass fiber coating layer 310 used in the direct type backlight device as illustrated in FIG. 6 may have a plurality of through holes 301 so that plurality of light emitting diodes 222 may be exposed. In this case, the plurality of through holes 301 may be formed to penetrate both the reflective sheet 300 and the glass fiber coating layer 310.

Figure 9:
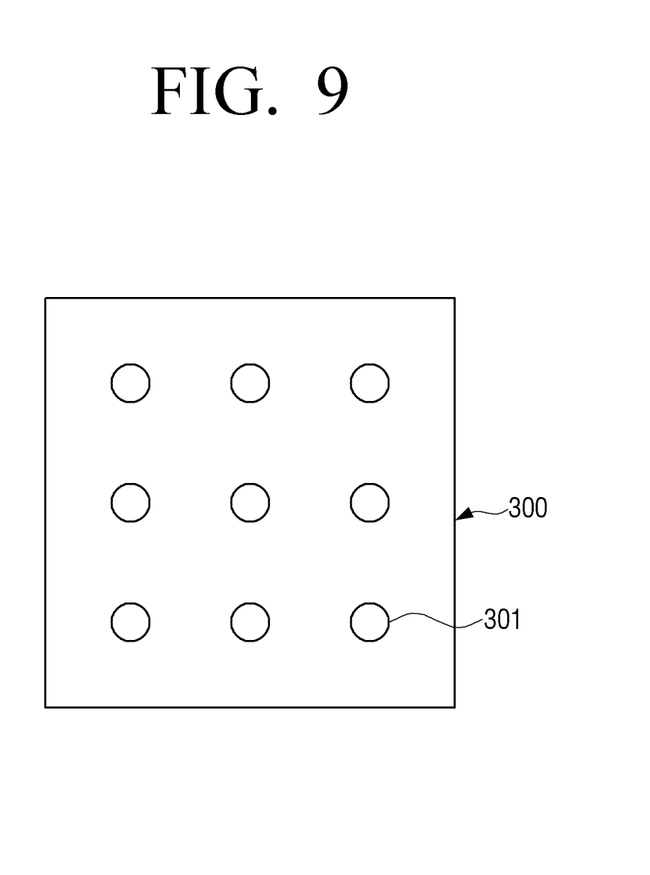
FIG. 9 is a plan view illustrating an example of a reflective sheet used in the liquid crystal display device of FIG. 6.

FIG. 9 is a plan view illustrating a reflective sheet used in the liquid crystal display device of FIG. 6. In this case, the glass fiber coating layer 310 may be formed on the lower surface of the reflective sheet 300.

When the reflective sheet 300 having the plurality of through holes 301 as illustrated in FIG. 9 is disposed on the upper surface of the lower chassis 250, the plurality of light emitting diodes 222 disposed on the printed circuit board 221 protrude above the reflective sheet 300 through the plurality of through holes 301 of the reflective sheet 300. The light exiting from the lower surface 231 of the light guide plate 230 is reflected by the reflective sheet 300 between the plurality of light emitting diodes 222 and enters the lower surface 231 of the light guide plate 230 to travel to the liquid crystal panel 210.

In addition, in the case of the liquid crystal display device 2 as illustrated in FIG. 6, because the light source 220 is disposed between the reflective sheet 300 and the light guide plate 230, the light guide plate 230 is supported by the plurality of supporters 260 and is spaced apart from the reflective sheet 300 by a predetermined distance. Accordingly, the reflective sheet 300 of the direct type backlight device as illustrated in FIG. 6 may not be provided with a bead coating layer on the upper surface of the reflective sheet 300 unlike the reflective sheet 100 of the edge type backlight device as illustrated in FIG. 1.

As described above, when the glass fiber coating layer 310 is formed on one surface of the reflective sheet 300, that is, the upper surface of the reflective sheet 300 or the lower surface of the reflective sheet 300, the stiffness of the reflective sheet 300 may increase, and the coefficient of thermal expansion of the reflective sheet 300 may be reduced.

Figure 10:
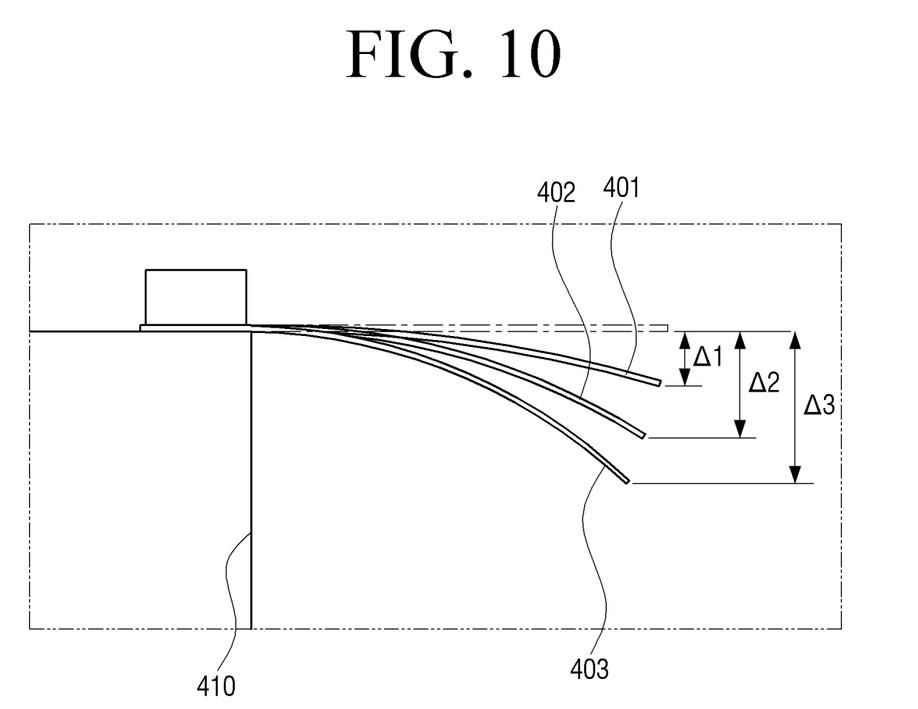
FIG. 10 is a view illustrating a sagging test result of a reflective sheet according to the prior art and a reflective sheet according to an embodiment of the disclosure.

FIG. 10 is a view illustrating a sagging test result of a reflective sheet according to the prior art and a reflective sheet according to an embodiment of the disclosure.

FIG. 10 shows a state in which a test piece 301 of a reflective sheet according to an embodiment of the disclosure and test pieces 302 and 303 of two conventional reflective sheets are prepared and the sags thereof are compared.

The test piece 401 of the reflective sheet 300 according to an embodiment of the disclosure has a glass fiber coating layer 310 formed on one surface of the reflective sheet 300 and is formed a strip shape having a narrow width and a long length. The test pieces 402 and 403 of the conventional reflective sheets are formed in a strip shape having a narrow width and a long length, similar to the test piece 401 of the reflective sheet according to the disclosure. The test piece 402 of the first conventional reflective sheet is made of polyester terephthalate, and the test piece 403 of the second conventional reflective sheet is made of polyester.

In a state in which the test piece 401 of the reflective sheet according to an embodiment of the disclosure, the test piece 402 of the first conventional reflective sheet, and the test piece 403 of the second conventional reflective sheet protrude from an edge of a supporting stand 410 to a predetermined length S, the sagging amounts Δ1, Δ2, and Δ3 of the test pieces 401, 402, and 403 were checked.

As can be seen from FIG. 10, the sagging amount Δ1 of the test piece 401 of the reflective sheet according to an embodiment of the disclosure is smaller than the sagging amounts 42 and 43 of the test piece 402 of the first conventional reflective sheet and the test piece 403 of the second conventional reflective sheet. From this result, it may be seen that the stiffness of the reflective sheet 300 according to an embodiment of the disclosure is higher than those of the reflective sheets according to the prior art.

Therefore, when the glass fiber coating layer is formed on one surface of the reflective sheet like the reflective sheet according to an embodiment of the disclosure, the stiffness of the reflective sheet may be increased. When the stiffness of the reflective sheet is improved in this way, the wrinkle phenomenon of the reflective sheet such as sagging or bending of the reflective sheet may be prevented or reduced. Accordingly, the image spot phenomenon of the display device caused by the wrinkle phenomenon of the reflective sheet may be reduced.

In addition, when the glass fiber coating layer is formed on one surface of the reflective sheet as in the disclosure, the total thickness of the reflective sheet and the glass fiber coating layer may be reduced compared to increasing the stiffness of the reflective sheet by increasing the thickness of the reflective sheet itself. Therefore, there is an advantage that the thickness of the liquid crystal display device may be reduced.

In addition, when the glass fiber coating layer is formed on one surface of the reflective sheet as in the disclosure, the coefficient of thermal expansion may be reduced, so that the expansion space provided around the reflective sheet may be reduced. Accordingly, the degree of freedom in designing the width of the bezel of the liquid crystal display device may be increased.

In the above description, the disclosure has been described by way of example. The terminology used herein is for the purpose of description and should not be regarded as limiting. Many modifications and variations of the disclosure are possible in light of the above teachings. Accordingly, unless otherwise stated, the disclosure may be practiced freely within the scope of the claims.

The invention claimed is:

1. A liquid crystal display device comprising:
a liquid crystal panel;
a light guide plate disposed under the liquid crystal panel;
a light source to supply light to the light guide plate;
a reflective sheet provided under the light guide plate;
a glass fiber coating layer provided on a lower surface of the reflective sheet; and
a lower chassis disposed under the reflective sheet.

2. The liquid crystal display device as claimed in claim 1 further comprising:
a bead coating layer provided between the light guide plate and the reflective sheet.

3. The liquid crystal display device as claimed in claim 2, wherein
the bead coating layer is provided on an upper surface of the reflective sheet.

4. The liquid crystal display device as claimed in claim 2, wherein the light source includes a plurality of light emitting diodes disposed on one side of the light guide plate.

5. The liquid crystal display device as claimed in claim 1, wherein the light source includes a plurality of light emitting diodes disposed under the light guide plate.

6. The liquid crystal display device as claimed in claim 5, wherein the reflective sheet and the glass fiber coating layer include a plurality of through holes through which the plurality of light emitting diodes pass.

7. The liquid crystal display device as claimed in claim 1, wherein the lower chassis includes at least one beading.

8. The liquid crystal display device as claimed in claim 1, wherein the glass fiber coating layer is formed of glass fiber pieces and a resin.

9. The liquid crystal display device as claimed in claim 1, wherein the reflective sheet is formed by mixing glass fiber pieces with any one of polyester terephthalate (PET), polycarbonate (PC), and polyester.

10. A liquid crystal display device comprising:
a liquid crystal panel;
a light guide plate disposed under the liquid crystal panel;
an optical sheet disposed on an upper surface of the light guide plate;
a light source to supply light to the light guide plate;
a reflective sheet provided under the light guide plate;
a glass fiber coating layer provided on a lower surface of the reflective sheet; and
a lower chassis disposed under the reflective sheet and having at least one beading.

11. The liquid crystal display device as claimed in claim 10, wherein the light source includes a plurality of light emitting diodes that are disposed on one side of the light guide plate and emit light to a side surface of the light guide plate.

12. The liquid crystal display device as claimed in claim 11 further comprising:
a bead coating layer formed on an upper surface of the reflective sheet.

13. The liquid crystal display device as claimed in claim 10, wherein the light source includes a plurality of light emitting diodes disposed under the light guide plate.

14. The liquid crystal display device as claimed in claim 13, wherein the reflective sheet and the glass fiber coating layer include a plurality of through holes through which the plurality of light emitting diodes pass.

* * * * *